United States Patent [19]

Lenhart

[11] Patent Number: 4,561,806

[45] Date of Patent: Dec. 31, 1985

[54] VERTICAL SINGLE FILER CONVEYOR SYSTEM

[75] Inventor: Ronald A. Lenhart, Lakewood, Colo.

[73] Assignee: Precision Metal Fabricators, Inc., Arvada, Colo.

[21] Appl. No.: 533,225

[22] Filed: Sep. 19, 1983

Related U.S. Application Data

[63] Continuation-in-part of Ser. No. 462,394, Jan. 31, 1983, abandoned.

[51] Int. Cl.⁴ .................................. B65G 51/00
[52] U.S. Cl. .......................................... 406/88
[58] Field of Search ............................ 406/88, 86

[56] References Cited

U.S. PATENT DOCUMENTS

| | | | |
|---|---|---|---|
| 3,180,688 | 4/1965 | Futer | 406/88 |
| 3,408,113 | 8/1968 | Bouladen | 406/88 |
| 3,890,011 | 6/1975 | Futer | 406/83 |
| 4,144,618 | 3/1979 | Campo et al. | 406/88 |
| 4,457,434 | 7/1984 | Brown et al. | 406/88 |

FOREIGN PATENT DOCUMENTS

| | | |
|---|---|---|
| 1479495 | 7/1977 | United Kingdom . |
| 2073122 | 10/1981 | United Kingdom ................ 406/88 |

Primary Examiner—Andres Kashnikow
Assistant Examiner—Mary Beth O. Jones
Attorney, Agent, or Firm—Fields, Lewis, Pittenger & Rost

[57] ABSTRACT

Air operated material handling equipment moves containers having elongated longitudinal axes from a mass in a bulk storage zone, wherein the longitudinal axes are disposed vertically and in side-by-side relation over a transport surface having a prearranged pattern of flotation air jet openings in the surface slanted in a downstream direction. The transport surface is divided into a plurality of zones including a bulk storage zone and a single file zone with one or more intermediate transport zones therebetween. The intermediate transfer zones have converging sides to move the containers from the bulk storage area into single file. Jets of air are delivered by angularly-disposed floatation air jet openings to lift, support and to move the articles forward. Additional acceleration jets of larger size accelerate the leading containers to separate them from the mass of containers in the intermediate transport zones to move them into single file. The converging sides bring the forward portion of the mass into an equilateral configuration and cooperate with the acceleration jets to move them subsequently into isosceles triangular configurations with an ever increasing base length and finally into single file.

12 Claims, 19 Drawing Figures

VERTICAL SINGLE FILER CONVEYOR SYSTEM

This application is a continuation-in-part of my copending U.S. patent application Ser. No. 462,394, filed Jan. 31, 1983, now abandoned.

DESCRIPTION

1. Technical Field

This invention relates to a single filed useful for transporting and moving containers and the like over relatively short distances from a large mass of containers to discharging the containers in a single file or stream. More particularly, the single filer accelerates the leading containers to move them away from the mass of containers to bring them into single file.

2. Background Art

There are many occasions in the mass production of containers of similar size made of paper, glass, plastic or metal and the like where a plurality of feed lines, as from a mass of containers, need to be fed into a single line or multiple single lines or that a single multiple line needs to be separated into one or more single lines. This is desirable for directing containers to testing stations, labeling, filling or other stations in a packaging operation and/or manufacturing operation.

There are devices presently known which may be used to separate a plurality of lines of objects into a single line. One such device is disclosed in German patent application No. P2505 333.2 entitled "Conveying System For Bottles Or Similar Objects". The conveyor comprises a primary belt conveyor for conveying bottles in at least two rows and elements for transferring the bottles to a second conveyor belt running parallel to the primary belt for a single row of bottles and running at a greater speed than the primary belt. The purpose is to provide a conveyor system wherein the bottles are collected by continuous, sliding and rolling movement without impact and hence at a minimal noise level, and where the risk of blocking bridge formation due to eventual wedging of two bottles between the side railings is reduced to a minimum. The belts are provided with two guide rails and the bottles are lubricated with soap and strive to occupy the smallest possible area in the form of three bottle groups where the centers of the three bottles form an equilateral triangle. When a triangular group arrives at a point of the collecting track where the distance between the side rails corresponds to 1.9 D, where D is the diameter of the bottles, this forms a barrier. This barrier ensures that the bottles are grouped slidingly and without shock in a zig-zag row by the pressure of the bottles from behind. This invention distinguishes over the German disclosure in the use of air as the propulsion and supporting means which allows for pulling the containers through the stage of multiple lines to a single file in contrast to mechanical belts which foster bridging and stoppage.

Another device is found in U.S. Pat. No. 3,710,919 entitled "Self-Arranging Conveyor" wherein containers supplied to the conveyor in a random fashion are arranged in a single file by being caused to follow a zig-zag path on a conveyor. The conveyor is characterized by stationary guides extending obliquely relative to the direction of transport, which guides cause the containers to follow a zig-zag course over the conveyor belt. There is no teaching of the use of air for supporting and conveying the containers as in the present invention.

U.S. Pat. No. 3,310,151 entitled "Article Combiner" indicates that the prior art has provided power driven vibrator means for shaking articles or oscillating one wall of the passage or temporarily reversing direction of motion of the conveyor as a means to prevent the formation and to terminate jamming of articles. It is indicated that if in the converging passage leading to the delivery conveyor, three circular bottles or cans are so relatively arranged that their center points define the corners of an equilateral triangle, with two of the articles contacting one wall and the third article contacting the other wall of the passage and with the third article contacting the two other articles, no jam will occur so long as the articles are supplied in sufficient quantity without interruption. This patent proposes the provision of a detector means within the supply and if the detector detects that the normal supply is reduced or ceases, once the non-jamming configuration has been established, the withdrawal of articles from the outlet will immediately cease so that the anti-jamming pattern in the converging passage remains intact until articles are again supplied in adequate quantity. This patent neither discloses nor suggests the use of air as a solution.

U.S. Pat. No. 3,117,665 entitled "Article Combiner For Conveyors" is directed to a machine whereby articles moved by a conveyor are handled and controlled in a random mass to reduce the mass to an orderly flow for feeding a processing machine. The purpose is to achieve an interrupted flow of articles from a disorderly mass to obtain a constant alignment of articles in at least a single row. It is proposed to supply yieldable guides converging in the direction of flow to funnel a disorderly mass of articles into constant alignment. The response of the yieldable guides in deflection under force applied by the flow of the articles is automatically varied by asymmetrically supporting and differentially loading the guides so that there is produced an ever changing degree of yield or deflection as the articles flow. Thus, the articles are prevented from forming a bridge or "log jam" at any point. This patent does not teach the present invention.

U.S. Pat. No. 3,774,747 entitled "Combining Conveyor Arrangement For Articles Such As Cans" provides for guide rails on a mechanical conveyor at least one of which is resiliently supported to provide for movement of the side rail guide in response to the pressure of articles advancing on the combining path and further provides for automatic ejection or removal of fallen articles from the combining path. No teaching is provided of air support and transport.

U.S. Pat. No. 3,109,529 entitled "Article Combining Conveyor Apparatus" has as its purpose the prevention of jams at the point where articles are caused to merge to form a single row. There is provided a series of parallel conveyors with means to permit shifting of articles from one conveyor to another where the conveyors are driven at a predetermined speed in a predetermined direction with control means to control the speed and direction and provide for temporary reversal of one of the conveyors. This patent relies upon belt conveyors and does not use or suggest air.

U.S. Pat. No. 3,999,806 entitled "Air Conveyor With Passive Divert" includes a conveying surface having slots therein through which air jets are used for conveying articles. One or more branch conveyor lines lead drom the main conveyor line for directing articles. A spur deflector guides the articles to prevent hang up at the junction. The conveying surface may also include one or more rows of lift holes for issuing a plurality of jets for lifting the conveyed articles off the conveying surface as they are being conveyed. This patent is directed to a diverter rather than a single filer.

These prior art devices all provide minimal control in the merging of containers due to lack of control over contact and the use of mechanical belt conveyors to propel or push and guide the containers. Where air is used, it is used in a manner which would not allow for varying pressures in different zones and would create undesirable movement of the containers both in direction and speed which may cause damage to the containers.

DISCLOSURE OF THE INVENTION

In accordance with this invention, an air operated material handling apparatus for the transport of cylindrical objects in a wide mass at an upstream location into a smaller width at a downstream location is provided. The apparatus comprises a table extending from the upstream location to the downstream location and having a surface, edges and an underside with a prearranged pattern of flotation air jets in the surface slanted at a downstream direction and communicating with surface and underside of the table. A plenum is connectable to a source of air under pressure and attached to the underside of the table surfaces. Additionally, vertical sides extend along each edge of the table which converge toward each other. The device also includes a row of acceleration jets, which provide a greater velocity and volume of air than the flotation air jets, located adjacent to and in parallel spaced relation to each side of the table to accelerate the objects as they move across the table from the upstream location to the downstream location so that the converging of the sides coact with the acceleration jets to separate and then converge the objects in a prearranged pattern having a lesser number object width than the mass.

More particularly, the air operated material handling apparatus includes a table which is divided into a plurality of zones, extending from an upstream location to a downstream location and having a surface, edges and having guide means which converge from the upstream location to the downstream location at different angles at each zone. The table includes an underside with a prearranged pattern of flotation air jets in the surface slanted at a downstream direction and communicating the surface with the underside of the table. A plenum is connectable to a source of air under pressure and attached to the underside of the table. A row of acceleration jets, which are larger than the air flotation jets, are located adjacent to and in spaced parallel relation to each side of each zone of the table to accelerate the containers as they move across the table from the upstream location to the downstream location so that the converging of the guide means coact with the acceleration jets to longitudinally separate and then converge the containers in a prearranged pattern from a mass of containers at the upstream location to single file at the downstream location. Advantageously, the guide means include closed sides with a pair of spaced guide rails for guiding the containers. A cover is spaced and supported above the table surface by the sides a distance slightly greater than the height of a container being worked upon to define, with the sides and table surface, a container conduit. The cover has exhaust openings of a size and pattern wherein the percentage of the area which the openings constitute increases along the length of the table from the upstream location to the downstream location to provide a progressively decreasing pressure in the container conduit. A separate distribution chamber is operatively connected to the underside of the table at each of the zones. A supply conduit supplies air from the plenum to each distribution chamber and a valve means is located at each of the supply conduits for adjustment of the air pressure within each distribution chamber and the associated air table zone. The guide means and the acceleration jets cooperate to move the mass of containers so groups of three of the containers are brought into side by side contact with each other and with the guide means so that their vertical axes define an equilateral triangle wherein the leading container is accelerated to separate it from the other of the containers which contacts the same guide means to form an isosceles triangle, the containers each being progressively accelerated by the acceleration jets and conveyed by the guide means to form an isosceles configuration with an ever increasing base until the containers are brought into a straight line at the downstream location.

Thus, it can be seen that with applicant's invention the cooperation between the acceleration jets and the converging sides accelerate the leading most containers away from the mass of containers and the decreasing air pressure in the container conduit draws the containers toward the downstream end and into single file. By this means, the containers are sequentially propelled from the downstream end of the conveyor rather than being pushed by the mass of containers at the upstream end of the conveyor, thus minimizing any chance of jamming of the containers. Also, contact between adjacent containers is minimized thereby reducing the chance that the containers become damaged. As is well understood in the art, unfilled aluminum containers are quite fragile and subject to scratching and denting, whereas after they are filled, they are much more rigid and less fragile.

Other advantages of this invention will become apparent from the following description taken in conjunction with the accompanying drawings.

BEST MODE FOR CARRYING OUT THE INVENTION

Figures 1, 2, 3, 4:
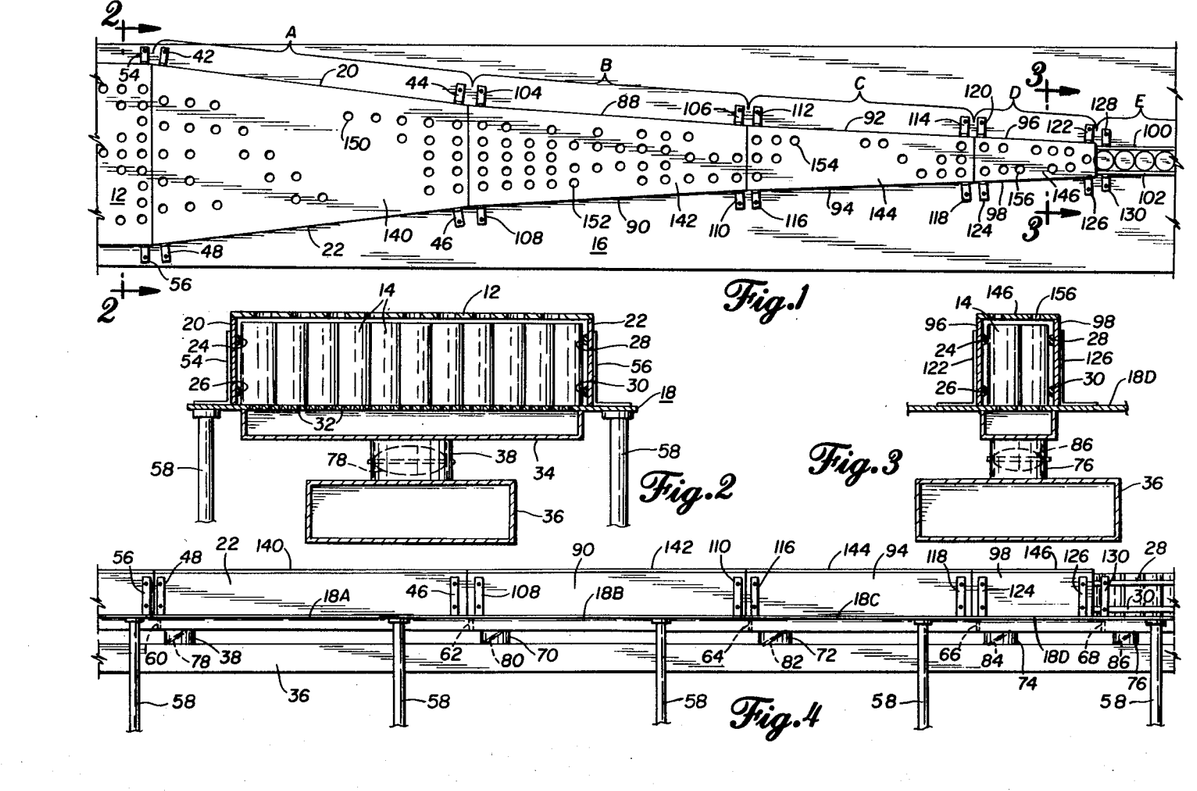
FIG. 1 is a top plan view of one embodiment of the single filer of the present invention showing the exhaust or vent configuration of the cover from the upstream random bulk storage location to the downstream single file location, wherein the vent configuration is shown only as an example and, not by way of limitation.
FIG. 2 is an enlarged cross sectional view, taken along line 2—2 of FIG. 1, showing the plenum construction and control for the first intermediate transport zone.
FIG. 3 is an enlarged cross sectional view, taken along line 3—3 of FIG. 1, showing the plenum construction and control for the fourth intermediate transport zone.
FIG. 4 is a side view in elevation of the apparatus of FIG. 1.
Figures 5, 6, 7, 8:
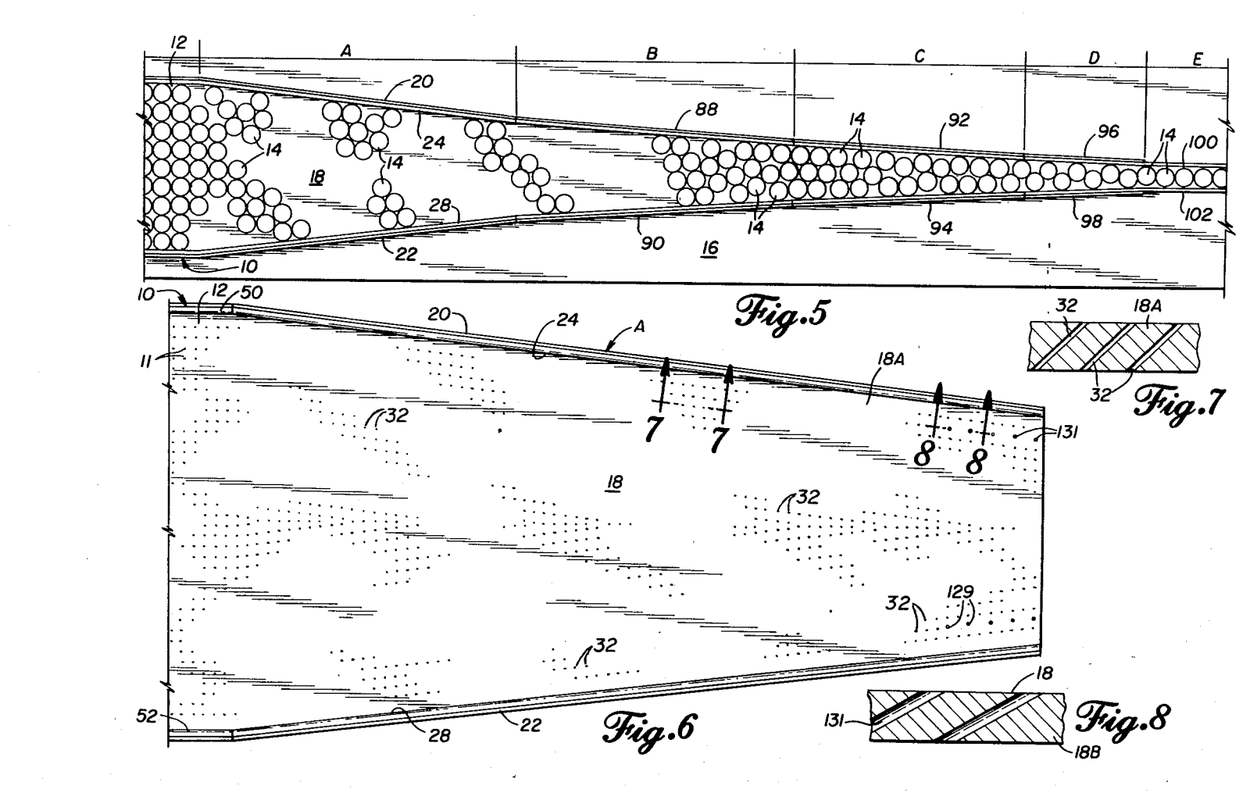
FIG. 5 is a top plan view of the single filer, similar to FIG. 1, but with the cover removed, showing the configuration of containers in progressing from the upstream, random mass location to the downstream single file location, with portions of the dense pack container pattern being omitted for clarity and ease of illustration.
FIG. 6 is, an enlarged top plan view of one upstream portion of the air table of the single filer of FIG. 5, showing the jet hole pattern, with portions of the jet pattern omitted for clarity and ease of illustration.
FIG. 7 is an enlarged cross sectional view, taken along line 7—7 of FIG. 6, showing the size and angle of the stabilizing or flotation air jet openings at one location along the table.
FIG. 8 is an enlarged cross sectional view, taken along line 8—8 of FIG. 6, showing the size and angle of the acceleration jets at another location along the table.
Figures 9, 10, 11, 12, 13, 14:
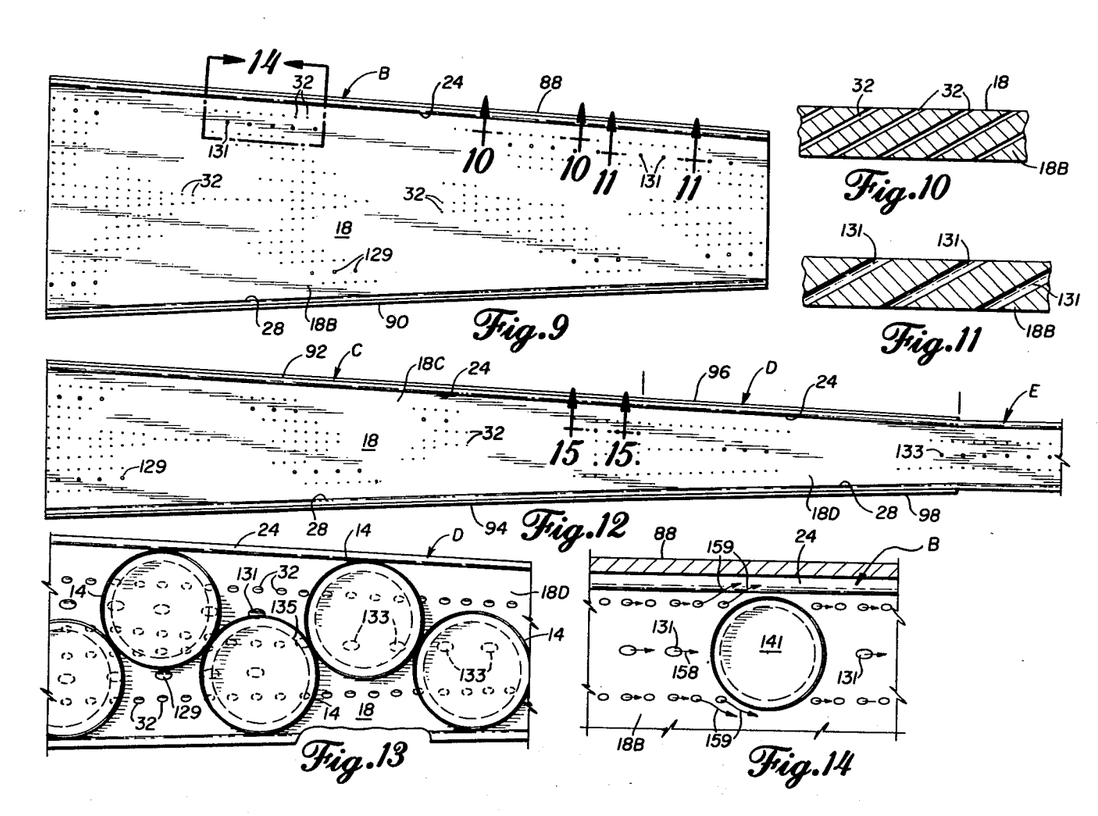
FIG. 9 is an enlarged top plan view of another more downstream portion of the air table of the single filer of FIG. 5, showing the air jet hole pattern with portions being omitted for clarity and ease of illustration.
FIG. 10 is an enlarged cross sectional view, taken along line 10—10 of FIG. 9, showing the size and angle of the air jet openings at one location along the table.
FIG. 11 is an enlarged cross sectional view, taken along line 11—11 of FIG. 9, showing the size and angle of the acceleration jets at another location along the table.
FIG. 12 is an enlarged top plan view of still another more downstream portion of the air table of the single filer of FIG. 5, showing the jet hole pattern with portions of the jet hole pattern omitted for clarity and ease of illustration.
FIG. 13 is a greatly enlarged, fragmentary, top plan view of a portion of FIG. 12, showing the cooperation between the flotation air jet hole pattern in a further downstream portion of the air table surface and the converging side walls to facilitate the transition of containers moving therealong from a double row to a single row.
FIG. 14 is a greatly enlarged, fragmentary, top plan view of an edge portion of FIG. 9, showing the position of the acceleration jets with respect to a container and the side edges and the flow of air between the container and the side wall.

The structural and operative features of the vertical air single filer of this invention are shown in FIGS. 1 and 13. The movement of containers is from the left to right, the containers being supplied from an air table 10 such as that disclosed in my U.S. Pat. No. 4,347,022. The air table is identified as a bulk storage zone 12 as shown in FIGS. 1, 5 and 6. As best seen in FIG. 5, the containers on an air table 10 at an upstream location are in bulk random mass. The single filer according to this invention differs from prior art single filers, in one respect, in that the containers 14 are fed thereto from random bulk such as that found on an air table 10 in an upright or vertical position and are processed through one or more stages or zones to a single file or series of vertically-positioned single containers 14. The vertical single filer of FIGS. 1–4 is shown as having a first zone "A" with a bottom 18A with upstanding converging side walls 20 and 22, each having upper and lower rigid guide rails 24, 26, 28 and 30, respectively. The bottom 18A is provided with a plurality of flotation air jet openings 32 which pass through the bottom 18A and communicate with a distribution chamber 34 for zone "A". The air jet openings 32 are in rows spaced laterally inwardly from the side edges as best seen in FIG. 6. The chamber 34 is connected to a plenum 36 via conduit 38 and the plenum is connected to a suitable source of air under pressure, such as from a blower, not shown. The jet openings 32 as shown in FIGS. 2 and 7 are inclined at a 45° angle in a downstream direction or to the right in FIG. 6. A suitable angle of the flotation jet openings 32 is in the range of from about 40° to 65° from the vertical and preferably from about 45° to 60°. The jet opening size and angle in various zones in concert with the static pressure of the air in the plenum 36 are chosen to provide the energy necessary to lift and stabilize and pull the containers 14 along, as desired. The size of the jets is selected with respect to the static pressure of the air supplied thereto to provide a vertical force sufficient to lift and support a container to be transported under stable conditions. The jet angles are selected to provide the force parallel to the surface required to move the containers at the desired speed. The containers must be greatly accelerated as they move across the air table in order to bring them into single file as they are discharged at a downstream location. Thus, angle and size of the jets will increase toward the downstream end to provide a greater horizontal vector to propel the containers. The size and angles can increase within each zone or from zone to zone as will be more fully discussed below. The side walls of zone "A" are secured to the bottom 18 by suitable bracket means 42, 44, 46 and 48. Side walls 50 and 52 are also provided on the air table 10 and are secured in like manner to the bottom of the air table by means of brackets 54 and 56. The bottom 18 is supported upon legs or columns 58 which rest upon a base (not shown). The plenum 36, conduit 38, and distribution chamber 34 are supported from bottom 18 by suitable means, not shown. The distribution chamber 34 is divided by partitions 60, 62, 64, 66 and 68 to correspond to zones "A", "B", "C", "D" and "E", each of which is fed from the common plenum 36 through conduits 38, 70, 72, 74 and 76, respectively. The flow of air volume through each conduit is controlled by means of a butterfly damper valve 78, 80, 82, 84 and 86, respectively.

The side walls 20 and 22 of zone "A" are seen to converge at one pair of angles, while side walls 88 and 90 of zone "B" converge at another pair of angles, side walls 92 and 94 of zone "C" converge at still another pair of angles and side walls 96 and 98 converge at another pair of angles into the single file zone "E" where the side walls 100 and 102 are straight and parallel. The side walls 88 through 102 are each secured to the bottom 18 by means of a pair of brackets 104, 106, 108, 110, 112, 114, 116, 118, 120, 122, 124, 126, 128 and 130, respectively. By way of example, in one embodiment of the invention, zone "A" may be 16¾ inches wide at the upstream end, with the sides converging at an angle of 5° 11′40″ over a distance of 38½ inches. The sides of zone "B" then converge at an angle of 2° 59′56″ over a distance of 34 inches. At this point, the sides of zone "C" converge at an angle of 2° 14′ 13″ for a distance of 28 inches. In zone "D", the sides converge at an angle of 2° 23′ 09″ for a distance of 15 inches. The sides are parallel in zone "E" and are spaced apart a distance of 2¾ inches.

As can be seen in FIG. 5, the number of containers 14 in moving to the right are reduced in width across the width of the vertical single filer and in moving from the air table bulk storage zone 12 across to the right or downstream extremity of zone "A". The air jet openings 32 in zone "A" may be 5/64-inch in diameter, by way of example, drilled at a 45° angle to a line perpendicular to the surface 18, on one-half inch centers along lines parallel to the sides 20 and 22 as shown in FIGS. 6, 7 and 8, and inclined downstream towards zone "B".

Figures 15, 16, 17:
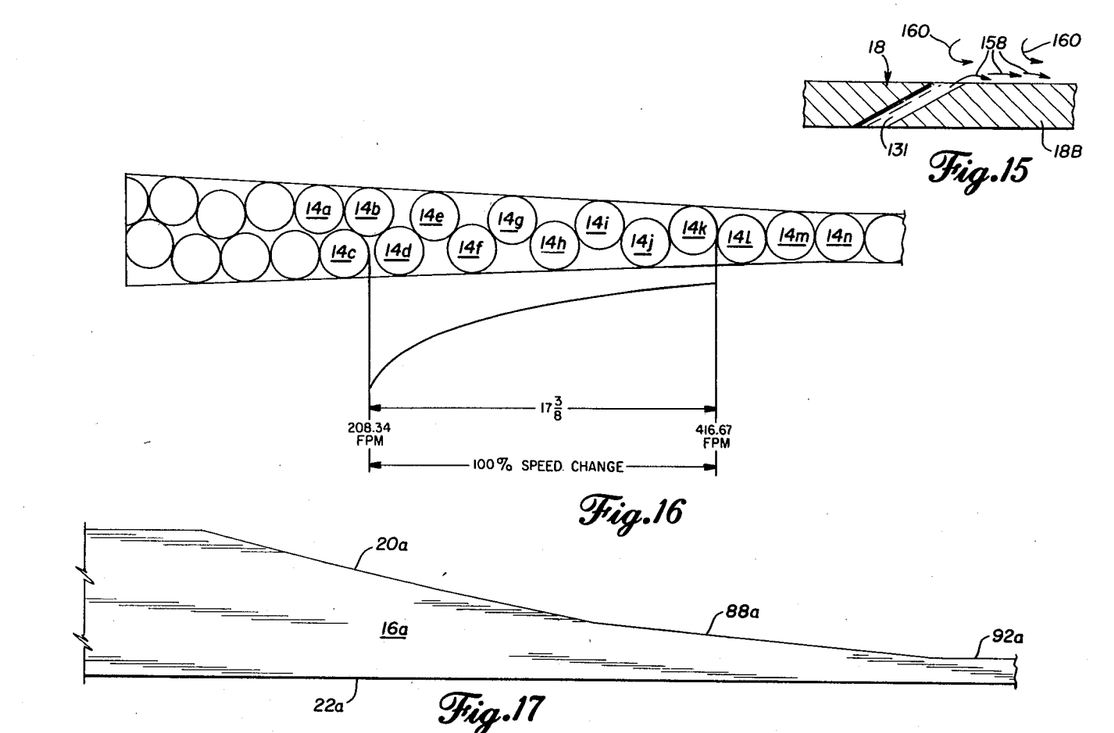
FIG. 15 is an enlarged cross sectional view, taken along line 15—15 of FIG. 12, to illustrate the flow of air from the acceleration jets and its effect on the entrained air.
FIG. 16 is a graphical representation of a speed curve illustrating the increase in acceleration of the containers through a speed change zone.
FIG. 17 is a plan view of an air table single filer that illustrates another embodiment of the present invention with one side being straight.

The flotation jet openings 32 in zones "B", "C", "D" and "E", FIG. 6, for container stabilizing or floating jets, by way of example, may be 1/16-inch in diameter and on one-half inch centers along lines parallel to the sides of each zone. All jet openings are inclined in a downstream direction. Although the starting point may be varied, in the embodiment shown and as illustrated in FIG. 6, larger acceleration jet openings 129 and 131 are provided as the second row of openings from each side wall starting with zone "B". As seen in FIG. 14 and FIG. 15, the acceleration jet openings, by way of example, may be ⅛-inch in diameter and inclined downstream at a 60° angle with respect to a line perpendicular to the surface. By way of further example, starting with zone "B", the stabilizing or flotation jets may be 1/16-inch at 60°. It will be noted that the acceleration jet openings are positioned with respect to the guides 24 through 30 such that the air issuing therefrom impinges on the superimposed container at approximately midway of the sides of the container bottom. It will be appreciated that some containers, notably beverage cans will have a chamfered bottom edge and a concave bottom. It is the area of the concave bottom that functions as the effective container bottom area for lifting, supporting and moving the containers.

The containers are lifted and stabilized on a grid of smaller jet openings and move in the direction of incline of these jet openings while the acceleration jet openings accelerate the outer row of containers in contact with the guides 24, 26, 28 and 30 such that the leading containers tend to separate from the mass and be guided toward, and finally, into, a single file arrangement by the cooperating and converging guides rather than being pushed one against another. Thus, the containers are pulled away from the upstream end toward the downstream end. Any pushing action on cans of extruded aluminum, fiber, plastic or steel is likely to cause deformation and result in bridging and stoppage of their transport. Pushing also sets up increased friction whereas the pulling or acceleration action of the container in accordance with this invention tends to reduce friction and container damage.

The spacing of the air jet openings 11 in the infeed or bulk storage zone 12 is quite close to provide adequate air flow beneath the containers. Air table 10 in bulk storage zone 12, by way of example, may use the same jet diameter as in zone "A", i.e., 5/64th of an inch and sufficient air to lift and stabilize the containers. The width of the infeed is selected to provide adequate storage of containers depending on the desired rate of flow of the containers. A narrower infeed for the same rate of flow will require the containers to move at a higher speed.

Since a principle of operation of the single filer of this invention is to accelerate and effectively pull the containers through the apparatus, a progressive increase in the acceleration must occur. This is accomplished by the use of different sizes of jet openings in each zone and different angles as required in each zone as previously discussed, and may be enhanced by providing individually adjustable and controlled pressures in the progressive discharge zones which will allow the static pressure in each zone to be adjusted individually to increase or decrease the static pressure. Where individual progressive discharge zones are used, the supply plenum pressure can be maintained constant.

The single filing of containers can be further enhanced by having them pass through a substantially closed container conduit having above ambient air pressure throughout, but wherein the air pressure decreases from the upstream end of the single filer to the downstream end. To provide such a conduit, the sides of each zone are solid. The sides of the respective zones support top covers, such as top cover 140 covering zone "A", cover 142 covering zone "B", cover 144 covering zone "C" and cover 146 covering zone "D". No cover is provided over the single file zone "E". The cover in each zone is provided with exhaust vents 150, 152, 154 and 156. Since the containers will move from a higher air pressure to a lower pressure, it is desirable to provide for a graduated reduction of air pressure within the container conduit which is represented in zone "A" by the area enclosed by bottom 18, sides 20 and 22 and top 140. The venting of air through the vent openings is progressively increased by increasing the percentage of the area of the cover constituted by the vents in the various zones. This can be done by putting in more vents increasing their size thereby decreasing the spacing between vents both in moving from the infeed zone 12 to zone "D". Once the containers reach the single file, "E", the containers will be subjected only to ambient pressure.

The operation of the apparatus of this invention is believed to be effected and enhanced by the Coanda effect in combination with Bernoulli's principle. The Coanda effect is the tendency of a jet of gas to follow the wall contour when discharged adjacent to a surface, even when that surface curves away from the jet discharge axis. This is accompanied by entrainment of air surrounding the wall, and thus reduces the pressure adjacent to it. Bernoulli's principle states that an increase in the speed of a fluid produces a decrease in pressure and a decrease in the speed produces an increase in pressure. Referring now to FIGS. 13, 14 and 15, air flows out of jets 129 and 131, as shown by arrows 158 with respect to jets 131 in FIG. 15. Also illustrated in FIG. 14 is the further Bernoulli effect where air flows between the outer rows of cans 141 and the sides, such as side 88 as shown by arrows 159. The increased speed of flow within this area creates a lower pressure, in accordance with Bernoulli's principal, causing the containers to hug the rails. Although illustrated with respect to zone "B", it will be understood that the principal will be the same with respect to each zone. This effect may also take place where a separation occurs momentarily between adjacent containers creating a lower pressure therebetween so that the containers are urged to maintain or reestablish immediate contact.

Because of the angle of the sides, the reduced pressure produced by the air passing between the sides and the outer row of containers creates a downstream force vector which tends to further enhance the pull-along or drafting effect of the containers to avoid any semblance of pushing on the containers. It will be noted that entrainment air, illustrated by arrows 158, FIG. 15, picks up and entrains adjacent air 160 which is available to assist and provide a drafting effect on the entrained air. Whenever a jet flows into a body of fluid flowing at a different rate or direction, it entrains some of the surrounding air and imparts its own motion thereto, this tends to draw the containers into the air stream created by jets 129 and 131 to accelerate them.

The Coanda effect is sometimes referred to as the wall-attachment principle. The discharge of air jet 131 at an angle adjacent the bottom 18B will cause a lower pressure between the jet and the bottom 18B causing the jet 158 to deflect toward the bottom 18B accompanied by entrainment of air 160 above the jet. As the angle of the jet opening 131 is increased closer and closer to being parallel to a surface such as that of bottom 18B, FIG. 15, the greater the Coanda effect. In this application, it is believed the combination effect of the Bernoulli principle and the Coanda effect provides a high velocity near the edge of the jet 158 and the bottom 18B creating a low pressure drafting effect on the adjacent surfaces of the containers.

As previously pointed out, if a force is applied to the containers from the rear to push on the containers, particularly with very flexible containers, but also with rigid ones, this will cause a bridging and locking because of increased friction of the containers ahead. As the containers move from bulk storage to a single file, the speed at which the containers move must increase markedly. If the containers are not discharged at an equivalent rate, the characteristics of the present invention allow the containers to be stopped completely or run at any intermediate speeds without requiring any air pressure adjustments.

Assuming it is desired to combine or merge a random mass of containers from eight wide to a single file flow at the rate of 2,000 containers per minute and that the containers are 2.5 inches in diameter, the flow is 4.8 containers at the output or discharge. The single file containers must be moved at 416.67 feet per minute to satisfy the above requirements. At the point along the single filer where the containers are two wide, the containers, must be moved at a speed of 208.34 feet per minute (FPM); and, where three wide, 138.89 FPM; four wide, 104.2 FPM; five wide, 83.3 FPM; six wide, 69.4 FPM; seven wide, 59.5 FPM; and, eight wide, 52.1 FPM, as illustrated in FIG. 16.

It must be remembered that the speed of the containers from one width reduction to another is not linear but increases progressively. In going from a condition where the containers are two wide (208.34 FPM) to a single file (416.67 FPM) within a linear distance of, for example, 17$\frac{3}{8}$ inches, the net speed change of a container, from one end of the speed change zone to the other, must be equal to an average rate of 11.99 FPM per inch of travel, see FIG. 16. As readily seen, the required acceleration for any number of combining of containers, i.e., 5 to 4, 4 to 3, 3 to 2, etc., can be calculated.

The following is offered as an example of how this is achieved with a fluid, such as air, using variable jet sizes, angles and static pressures. The difference in velocities out of a 5/64-inch diameter jet at 0.6 inches and 1.0 inches of static pressure is about 1600 FPM and about 2100 FPM, respectively, or 125 FPM per 0.1 inch of static pressure difference. The horizontal vector velocity of about 1600 FPM at an angle of 34° to the surface of the table is about 617 FPM while the horizontal vector velocity of about 1600 FPM at an angle of 32° is about 570 FPM and at an angle of 36° it is about 662 FPM. As an example only, since other and various static pressures, jet opening sizes and angles may be used, if greater acceleration is desired, the jet opening size can be increased to say 3/32-inch diameter. With a static pressure in the distributor plenum 34 of 0.6 inches of water, a 3/32-inch diameter jet opening will give a velocity of about 2,300 FPM compared to about 1,600 FPM with a 5/64-inch diameter jet opening and a 5/32-inch diameter jet opening will give a velocity of about 3,100 FPM. With a static pressure of 1.0 inch of water in the distributor plenum, the velocity of air issuing from a 5/64-inch diameter jet opening is about 2,100 FPM while the velocity from a 5/32-inch diameter jet opening is about 4,100 FPM. The volume of CFM out of a a 5/64-inch opening is about 0.0697 CFM and from a 5/32-inch opening is about 0.5453 CFM at 1.0 inches of water static pressure.

The small flotation air jet openings 32 in the bottom of the air table of the single filer act to stabilize the containers 14 for transport while the acceleration jet openings 129 and 131 are positioned to impinge air on the center of the bottom of the containers forming the outer conveying rows of containers. Since most of the resistance to transport occurs between the outer row of containers and the guides, the acceleration jets 131 move the outer row of containers along the guides 24 as the converging action occurs.

Figure 18:
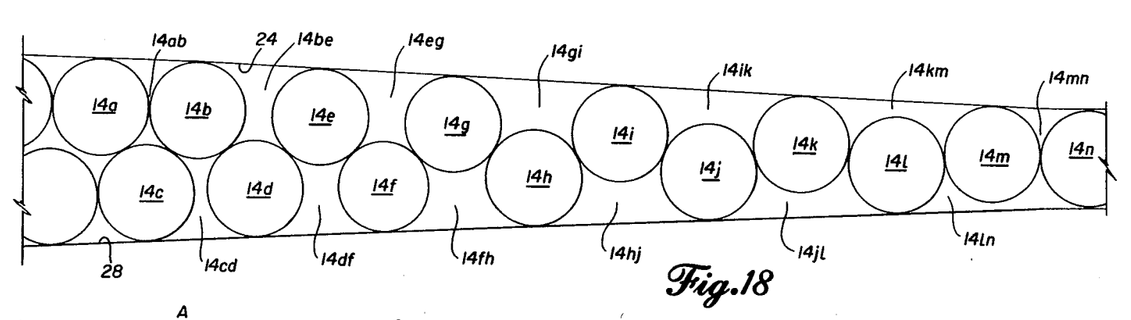
FIG. 18 is a diagrammatic illustration of the pattern of containers progressing from an equilateral triangle configuration through changing isosceles triangle configurations to a single file.

Referring to FIGS. 16 and 18, it may be visualized how the containers have to accelerate in moving from one zone (two wide) to another (one wide) or a 100% speed increase. If we are moving 2,000 objects per minute and the objects start at 4 wide, this requires a speed of 500 objects per minute. If the objects measure 4.8 objects per foot, the speed of the objects in feet per minute (FPM) is obtained from Equation 1.

Equation 1: rate/(4.8 per foot)(No wide)=FPM
For four objects wide transferred to one object wide, the change and increase in speed would be:

2000/(4.8×4)=104 FPM
2000/(4.8×3)=138 FPM=32.69% increase
2000/(4.8×2)=208 FPM=50.72% increase
2000/(4.8×1)=416 FPM=100% increase Thus, it is readily seen that the speeds are required to increase by monumental amounts to achieve the smooth transition from say 500 objects per minute to 2,000 objects per minute.

In FIG. 18, containers 14a, 14b and 14c form an equilateral triangle with the containers in contact with each other and containers 14a and 14b are in contact with guide rail 24 and container 14c is in contact with guide rail 28. There is a small space between containers 14c and 14d so that these containers, along with container 14b, form an isosceles triangle. Containers 14a and 14b are in longitudinal contact at 14ab. A space 14cd exists between 14c and 14d. Progressively larger spaces exist between the containers in the downstream direction such as: space 14be between containers 14b and 14e; space 14df between containers 14d and 14f; space 14eg between containers 14e and 14g; space 14fh between containers 14f and 14h; space 14gi between containers 14g and 14i; space 14hj between containers 14h and 14j; space 14k between containers 14i and 14k; space 14jl between containers 14j and 14l; space 14km between containers 14k and 14m; and space 14ln between containers 14l and 14n. Thus, it is readily seen that the containers are accelerated most rapidly when separation first begins progressively to accelerate, but at a decreasing rate, toward the downstream end as illustrated by the graph of FIG. 16. The graph of FIG. 16 is a plot of the length of the space between the containers as a function of the distance travelled by the containers progression to a single file configuration, that is the distance the leading edge of container 14c in an equilateral triangular grouping to the leading edge of container 14k or a distance in the example of 17-3/8 inches. In the same time interval, container 14d moves 1/4 inch; container 14e moves 3/8 inch; container 14f moves 15/16 inch; container 14g moves 1-5/16 inch; container 14h moves 1-13/16 inch; container 14i moves 2 inches; container 14j moves 2-3/16 inches and container 14k moves 2-5/16 inches, to illustrate the progressively increasing speed of the containers as a result of the combination of selected angle or angles of the sides and the acceleration of the containers caused by the acceleration air jets. A container 14c traveling at a speed of 208.24 feet per minute will be accelerated to a speed of 416.67 feet per minute or a 100% increase in speed while maintaining contact proximity with adjacent containers.

Figure 19:
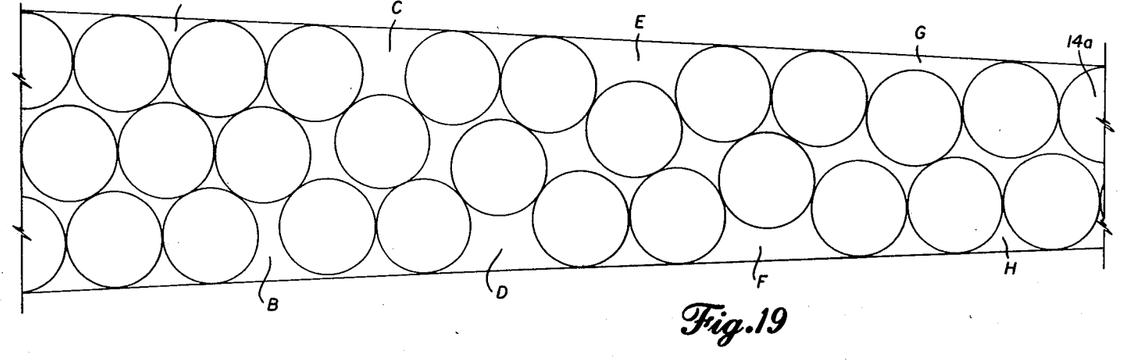
FIG. 19 is a diagrammatical illustration of the pattern of containers progressing from a substantially equilateral triangle configuration through a series of isosceles triangle configurations to another equilateral triangle configuration of FIG. 18.

FIG. 19 is a continuation of the air table of FIG. 18 in the upstream direction showing the pattern configuration of the containers in the zone where the number of containers wide goes from three wide to two wide. It will be noted that three containers form an equilateral triangular group in contact with one side while the group in contact with the opposite side form an isosceles triangular group with increasing space A, B, C, D, E, F, G and H until the formation of the equilateral triangular group 14a, 14b and 14c. Thus, in the zone where three containers move into a two wide configuration there is a continuing and changing isosceles triangular group in combination with a substantially equilateral triangular group.

It will also be noted in FIG. 13 where the acceleration jets 129 and 131 converge in zone "D" to a separation distance just greater than a distance equal to the length of the radius of the containers, a single centrally positioned row of acceleration jets 133 are provided with the initial jet 133 being positioned just under and impinging upon the leading edge 135 of a container 14 such that only one of the acceleration jets 129 and 131 provide both lift and propulsion of the containers while stabilizing or flotation jets 32 provide supplemental air lift, support and also assist in moving the containers downstream. This is accomplished by providing the smaller stabilizing jets in greater numbers giving equal distribution of air beneath the containers to provide the necessary stability. Of course, there is sufficient volume of air supplied by the stabilizing jets to support the containers on the order of about 0.004 to about 0.005 inches off the surface of the air table. It is also important to note that as the acceleration jets 131 converge there will be two acceleration jets 129 and 131 in side-by-side relation. To transfer the containers to a single row of acceleration jets, the double rows of acceleration jets are terminated at a point where by side-by-side separation is spaced apart a distance just slightly greater than the diameter of the containers. At the same time, a single row of acceleration jets 133 start with the first jet opening being positioned to just impinge on and pick up the leading edge 135 of a container when one acceleration jet of the last pair is uncovered by the superimposed containers. The single row of acceleration jets 133 may be of increased size, such as 9/64-inch diameter to provide sufficient air for transport and final acceleration to the required single file discharge speed.

Although the acceleration jets have been described and illustrated as being larger than the flotation jets, it will be understood that for particular applications they could be the same size or smaller than the flotation jets. This is possible as long as air is supplied to the acceleration jets at sufficient pressure that the air issuing from the acceleration jets is at greater speed and volume than the air issuing from the flotation jets.

FIG. 17 illustrates another embodiment of the present invention wherein single filer table 16a is provided with a side 22a that is straight while side 20a is provided with a converging side configuration for zone "A" and a side 88a converging at a different angle in zone "B" and a side 92a converging at another angle in zone "C". The air jet openings and cover may be quite similar to that for filer table 16 as well as the plenum and air distribution and rigid guides along both the straight and converging sides.

From the foregoing, the advantages of this invention are readily apparent. A device has been provided for bringing a mass of vertically aligned cans into single file over a relatively short distance. This is accomplished by cooperation between converging sides of the single filer together with acceleration jets which pull the containers at the forward edge of the mass away from the others and accelerate them so that they come into single file arrangement by the time they reach the downstream end of the single filer. The containers are lifted, supported and transported by normally smaller flotation air jets positioned in a table surface along the single filer over which the containers move. Furthermore, a conduit may be provided through which the containers move across the table wherein the air pressure therein is greater than ambient, but decreases from the upstream end to the downstream end so that the cans move toward the lower pressure, i.e., the downstream end. Control of the air pressure is obtained by a cover having exhaust openings which are sized and spaced so as to provide greater discharge of air toward the downstream end of the container conduit. The conduit can be divided into separate sections having separate air control means for supporting and transporting the containers, as well as for creating the above ambient air pressures desired. Also, the angle of the converging walls can be adjusted in each section, as required.

Although the objects being transported by the single filer of this invention have been described as "containers", it will be understood, as used herein, the term "container" is intended to refer to any cylindrical object, such as cans, cartons, bottle caps, and the like.

While there have been described what at present are considered to be the preferred embodiments of this invention, it will be obvious to those skilled in the art that various changes and modifications may be made therein without departing from the invention.

I claim:

1. Air operated material handling apparatus for the transport of light-weight, upright, cylindrical objects in a wide mass at an upstream location at an ever increasing velocity into a smaller width at a downstream location, along a centerline of said apparatus, said apparatus comprising:

a table having at least three zones extending from said upstream location to said downstream location and having a surface, side edges and an underside with a prearranged pattern of flotation air jets, wherein said air jets are in rows, said rows being spaced laterally inward from said side edges, and said air jets are in said surface slanted in a downstream direction and communicating said surface and said underside of said table;

a plenum connectable to a source of air under pressure and attached to said underside of said table surface;

a vertical side along each edge of said table, said sides converging toward each other in the downstream direction;

a row of acceleration jets, which are larger in size than said flotation air jets but smaller in size than the spacing between adjacent rows of said flotation air jets, located in said table adjacent to and in spaced parallel relation to each converging side of the table to form two converging rows of acceleration jets; and means to provide an incrementally increasing volume and velocity of air through said acceleration air jets between each of said three zones from said upstream location to said downstream location to accelerate and longitudinally separate the objects as they move along the table from said upstream location to said downstream location so that the converging of said sides coacts with the acceleration jets to converge the longitudinally separated objects in a prearranged pattern having a lesser number object width than said mass.

2. Apparatus, as claimed in claim 1, wherein said means to incrementally increase the volume and velocity of air includes:

increasing the diameter of said air jets from said upstream location to said downstream location.

3. Apparatus, as claimed in claim 1, wherein:

said rows of acceleration jets are spaced inwardly from said respective sides a distance equal to one-half the width of the objects being transported and at least some of said flotation air jets are located between said acceleration jets and said side to balance said objects over said acceleration air jets.

4. Air operated material handling apparatus for the transport of cylindrical objects in a wide mass at an upstream location into a smaller width at a downstream location, along a centerline of said apparatus, said apparatus comprising:

a table extending from said upstream location to said downstream location and having surface, edges and an underside with a prearranged pattern of flotation air jets in said surface slanted in a downstream direction and communicating said surface and said underside of said table;

a plenum connectable to a source of air under pressure and attached to said under side of said table surface;

a vertical side along each edge of said table, said sides converging toward each other; and a row of acceleration jets located adjacent to and in spaced parallel relation to each side of the table and which are larger than said flotation air jets to provide a greater volume and velocity of air than said flotation air jets to accelerate the objects as they move along the table from said upstream location to said downstream location so that the converging of said sides coacts with the acceleration jets to separate and then converge the objects in a prearranged pattern having a lesser number object width than said mass;

means enclosing said vertical sides; and a cover spaced and supported above the table surface by said sides a distance slightly greater than the height of an object being worked upon to define with said side and table surface an object conduit, said cover having exhaust openings therein of a size and pattern wherein the total percentage of open area increases along the length of the table from said upstream location to said downstream location to provide a progressively decreasing pressure in the object conduit from said upstream location to said downstream location while establishing and maintaining a greater than ambient pressure therein.

5. Apparatus, as claimed in claim 4, wherein said object conduit is divided into a plurality of air table zones along the length thereof, said apparatus further including:

a separate distribution chamber operatively connected to said underside of said table at each of said air table zones;

a supply conduit to supply air from said plenum to each said distribution chamber at progressively higher pressure from said upstream location to said downstream location; and valve means at each said distibution chamber for adjustment of air pressure and air flow within each distribution chamber and associated air table zone to provide increased air flow in said air table zones from said upstream location to said downstream location.

6. Apparatus, as claimed in claim 5, wherein:

said sides along each of said zones converge at the same angle with respect to said centerline and at a different angle with respect to said centerline with respect to each other zone.

7. Air operated material handling apparatus for the transport of light-weight, cylindrical containers in vertical orientation from a wide mass at an upstream location at an ever increasing velocity to single file at a downstream location, said apparatus comprising:

a table, having a centerline and being divided into at least three zones, extending from said upstream location to said downstream location and having a surface, side edges and having guide means which converge from said upstream location toward said downstream location at different angles at each zone but at equal angles at each side with respect to said centerline and an underside with a prearranged pattern, of flotation air jets wherein said air jets are in rows, said rows being spaced laterally inwardly from said side edges, and said air jets are in said surface slanted in a downstream direction and communicating said surface and said underside of said table;

plenum connectable to a source of air under pressure and attached to said underside of said table;

a row of acceleration jets, which are larger in size than said flotation air jets but smaller in size than the spacing between adjacent rows of said flotation alr jets, located in said table adjacent to and in spaced parallel relation to each converging side of each zone of the table to form two converging rows of acceleration jets; and means to provide an incrementally increasing volume and velocity of air through said acceleration air jets between each of said three zones from said upstream location to said downstream location to accelerate and longitudinally separate the containers as they move along said table from said upstream location to said downstream location so that the converging of said guide means coacts with the acceleration jets to longitudinally separate and then converge the containers along said centerline in a prearranged pattern from a mass of containers at said upstream location to single file at said downstream location.

8. Apparatus, as claimed in claim 7, wherein:

said sides at said downstream end have portions which are parallel to said centerline and spaced apart a distance slightly greater than the diameter of said containers, said two converging rows of acceleration jets terminating upstream of the parallel portions of said sides;

a third row of acceleration jets in said table at said downstream location located along said centerline between said parallel portions and extending upstream to a point adjacent the termination of said converging rows of acceleration jets; and at least one row of flotation air jets between each parallel portion of said sides and said third row of acceleration jets to balance said containers over said third row of acceleration jets.

9. Air operated material handling apparatus for the transport of cylindrical containers in vertical orientation from a wide mass at an upstream location to single file at a downstream location, said apparatus comprising:

a table, having a centerline and being divided into a plurality of zones, extending from said upstream location to said downstream location and having a surface, edges and having closed sides with a pair of spaced guide rails for guiding the containers, which closed sides converge from said upstream location toward said downstream location at different angles at each zone but at equal angles at each side with respect to said centerline and an underside with a prearranged pattern of flotation air jets in said surface slanted in a downstream direction and communicating said surface and said underside of said table;

a plenum connectable to a source of air under pressure and attached to said underside of said table;

a row of acceleration jets, which are larger than said flotation air jets, located adjacent to and in spaced parallel relation to each side of each zone of the table to accelerate the containers as they move along said table from said upstream location to said downstream location so that the converging of said guide rails coacts with the acceleration jets to longitudinally separate and then converge the containers along said centerline in a prearranged pattern from a mass of containers' at said upstream location to single file at said downstream location; and a cover spaced and supported above the table surface by said sides a distance slightly greater than the height of a container being worked upon to define with said sides and table surface a container conduit, said cover having exhaust openings therein of a size and pattern wherein the total percentage of open area increases along the length of the table from said upstream location to said downstream location to provide a progressively decreasing pressure in the container conduit from said upstream location to said downstream location while establishing and maintaining a greater than ambient pressure therein.

10. Apparatus, as claimed in claim 9, further including:

a separate distribution chamber operatively connected to said underside of said table at each of said zones;

a supply conduit to supply air from said plenum to each said distribution chamber at progressively higher pressure from said upstream location to said downstream location; and valve means at each said distribution chamber for adjustment of air pressure and air flow within each distribution chamber and associated air table zone to provide increased air flow in said air table zone from said upstream location to said downstream location.

11. A method of conveying and converging a mass of vertically aligned, light-weight, cylindrical containers from an upstream location to single file at a downstream location, said method comprising the steps of:

providing an air table having at least three zones, a surface, side edges and an underside with a plurality of flotation jet openings in a prearranged pattern and a plurality of acceleration jet openings all slanted in a downstream direction and arranged in rows wherein one row is parallel to each side edge;

supplying air through the flotation jet openings at suffient speed and volume to lift, support and move the containers from the upstream location to the downstream location;

supplying air through the acceleration jet openings at an incrementally increasing velocity between said three zones from the upstream location to the downstream location by increasing the size of the jet openings in the downstream location to separate the most downstream containers from the mass; and conveying the separated containers into a single file at the downstream location.

12. A method of conveying and converging a mass of vertically aligned, light-weight, cylinderical containers from an upstream location to single file at a downstream location, said method comprising the steps of:

providing an air table having a surface with a plurality of flotation jet openings and a plurality of acceleration jet openings all slanted in a downstream direction;

supplying air through the flotation jet openings at sufficient speed and volume to lift, support and move the containers from the upstream location to the downstream location;

supplying air through the acceleration jet openings at an ever increasing velocity from the upstream location to the downstream location to spearate the most downstream containers from the mass; and converging the separated container into single file at the downstream location;

providing a conduit from the upstream location to the downstream location which includes said air table surface, converging side edges and a cover spaced above the surface a distance slightly greater than height of the containers extending to each side edge and from the upstream location to the downstream location and having exhaust openings therein;

moving the containers through the conduit from the upstream location to the downstream location at an increasing velocity;

convering the containers laterally at different rates in each zone;

providing a continuous above ambient air pressure within the conduit; and decreasing the air pressure incrementally in successive zones by increasing exhaust opening area from the upstream location to the downstream location to draw the containers toward the downstream location.

* * * * *